US011562522B2

(12) United States Patent
Deconinck et al.

(10) Patent No.: US 11,562,522 B2
(45) Date of Patent: Jan. 24, 2023

(54) METHOD AND SYSTEM FOR IDENTIFYING INCOMPATIBILITY BETWEEN VERSIONS OF COMPILED SOFTWARE CODE

(71) Applicant: Weta Digital Limited, Wllington (NZ)

(72) Inventors: Florian Deconinck, Wellington (NZ); Sander van der Steen, Wellington (NZ); Richard Chi Lei, Wellington (NZ); Adam Christensen, Wellington (NZ); Niall J. Lenihan, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 48 days.

(21) Appl. No.: 17/231,918

(22) Filed: Apr. 15, 2021

(65) Prior Publication Data
US 2022/0028146 A1  Jan. 27, 2022

Related U.S. Application Data

(60) Provisional application No. 63/056,432, filed on Jul. 24, 2020.

(51) Int. Cl.
*G06T 13/40* (2011.01)
*G06F 8/41* (2018.01)
*G06F 8/34* (2018.01)

(52) U.S. Cl.
CPC ............ *G06T 13/40* (2013.01); *G06F 8/34* (2013.01); *G06F 8/41* (2013.01)

(58) Field of Classification Search
None
See application file for complete search history.

(56) References Cited

U.S. PATENT DOCUMENTS

| 5,303,313 | A | * | 4/1994 | Mark | H04N 1/4115 |
| | | | | | 382/209 |
| 9,489,759 | B1 | | 11/2016 | Gregory | |
| 2005/0086069 | A1 | * | 4/2005 | Watson | H04N 21/4755 |
| | | | | | 726/3 |

(Continued)

FOREIGN PATENT DOCUMENTS

EP   3358527 A   8/2018

OTHER PUBLICATIONS

Bhali, Zeeshan, et al. "Template based procedural rigging of quadrupeds with custom manipulators." 2013 International Conference on Advanced Computer Scienve Applications and Technologies. IEEE, 2013.[Year: 2013], Dec. 2013.

(Continued)

*Primary Examiner* — Joni Hsu
(74) *Attorney, Agent, or Firm* — Trellis IP Law Group, PC; Lisa Benado

(57) ABSTRACT

An aspect provides a computer-implemented method for compiling software code. The method comprises: receiving software code to compile; receiving a set of parameters associated with settings and software employed to compile the software code; forming a first hash of the set of parameters to establish a unique identification of the set of parameters used to compile the software code; and associating the first hash with the compiled code. A further aspect provides a computer-implemented method of checking compatibility of compiled software code.

13 Claims, 8 Drawing Sheets

(56) References Cited

U.S. PATENT DOCUMENTS

| | | |
|---|---|---|
| 2009/0091563 A1 | 4/2009 | Viz |
| 2011/0102424 A1 | 5/2011 | Hibbert |
| 2012/0210262 A1 | 8/2012 | Sheeler |
| 2013/0278607 A1* | 10/2013 | Twigg .................... G06T 13/80 345/473 |
| 2015/0022517 A1 | 1/2015 | Jutan |
| 2016/0103828 A1 | 4/2016 | Woolf |
| 2019/0325633 A1 | 10/2019 | Miller |
| 2020/0320764 A1 | 10/2020 | Bryson |
| 2020/0334076 A1* | 10/2020 | Fahs ........................ G06T 1/20 |

OTHER PUBLICATIONS https://www.indefiant.com—Indefiant Recode—5 pages.
https://www.liveplusplus.tech—Live++—7 pages.

* cited by examiner

METHOD AND SYSTEM FOR IDENTIFYING INCOMPATIBILITY BETWEEN VERSIONS OF COMPILED SOFTWARE CODE

CROSS REFERENCES TO RELATED APPLICATIONS

This application claims the benefit of U.S. Provisional Patent Application Ser. No. 63/056,432, METHOD AND SYSTEM FOR IDENTIFYING INCOMPATIBILITY BETWEEN VERSIONS OF COMPILED SOFTWARE CODE, filed on Jul. 24, 2020, which is hereby incorporated by reference as if set forth in full in this application for all purposes.

FIELD

The present disclosure generally relates to techniques and systems for identifying incompatibility between versions of compiled software code. More particularly the present disclosure relates to techniques for using a hash to identify variations in compiled code.

BACKGROUND

Visual content generation systems are used to generate imagery in the form of still images and/or video sequences of images. The still images and/or video sequences of images include live action scenes obtained from a live action capture system, computer generated scenes obtained from an animation creation system, or a combination thereof.

An animation artist is provided with tools that allow them to specify what is to go into that imagery. Where the imagery includes computer generated scenes, the animation artist may use various tools to specify the positions in a scene space such as a three-dimensional coordinate system of objects. Some objects are articulated, having multiple limbs and joints that are movable with respect to each other.

The animation artist may retrieve a representation of an articulated object and generate an animation sequence movement of the articulated object, or part thereof. Animation sequence data representing an animation sequence may be stored in data storage, such as animation sequence storage described below.

Various aspects of animation sequence movement may be authored in source code that is then compiled for runtime operation efficiency. Compiled code has the potential to be different between compilations due to, for example, different versions of compiler. This can lead to binary incompatibility that can require extensive manual version checking.

It is an object of at least preferred embodiments to address at least some of the aforementioned disadvantages. An additional or alternative object is to at least provide the public with a useful choice.

SUMMARY

Disclosed herein are techniques and systems for identifying potential incompatibility between versions of compiled software code. More particularly the present disclosure relates to techniques for using a hash to identify variations in compiled code.

In accordance with an aspect, a computer-implemented method for compiling software code comprises: receiving software code to compile; receiving a set of parameters associated with settings and software employed to compile the software code; forming a first hash of the set of parameters to establish a unique identification of the set of parameters used to compile the software code; and associating the first hash with the compiled code.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment, forming the first hash of the set of parameters includes determining an order of the set of parameters.

In accordance with an aspect, a computer-implemented method of checking compatibility of compiled software code comprises: in response to a request for code compiled by the method described above, verifying a second hash of the parameters matches the first hash.

In an embodiment, the method further comprises, in response to the request for the compiled code, recompiling the software code if the first hash and the second hash are different.

In an embodiment, the method further comprises, on determining that the second hash does not match the first hash, searching among a plurality of stored compiled code blocks having associated respective stored hashes for a stored hash that matches the second hash.

In an embodiment, the method further comprises, on determining that a stored hash matches the second hash, retrieving a compiled code block associated with the stored hash from a storage device.

In an embodiment, the method further comprises, on determining that the second hash does not match the first hash: partitioning the compiled code into at least a first code block and a second code block; associating a first code block hash with the first code block; and searching among a plurality of stored compiled code blocks having associated respective stored hashes for a stored hash that matches the first code block hash. On determining that a stored hash matches the first code block hash, the method includes: retrieving a compiled code block associated with the stored hash from a storage device; and combining the retrieved compiled code block with at least the second code block.

In an embodiment, the set of parameters includes at least a version of the software used to compile the software.

In an embodiment, the set of parameters includes a storage hierarchy.

In an embodiment, the compiled code comprises evaluation logic specifying how at least one animation control influences a skeletal hierarchy associated with a control rig.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described below are techniques and systems for identifying potential incompatibility between versions of compiled software code. In particular, techniques are disclosed for using a hash to identify variations in compiled code. The techniques and systems described below are described with reference to evaluation of animation sequence movements. It will be appreciated that the same techniques and systems may be applied to other generic types of source code unrelated to animation sequence movements.

Figure 1:
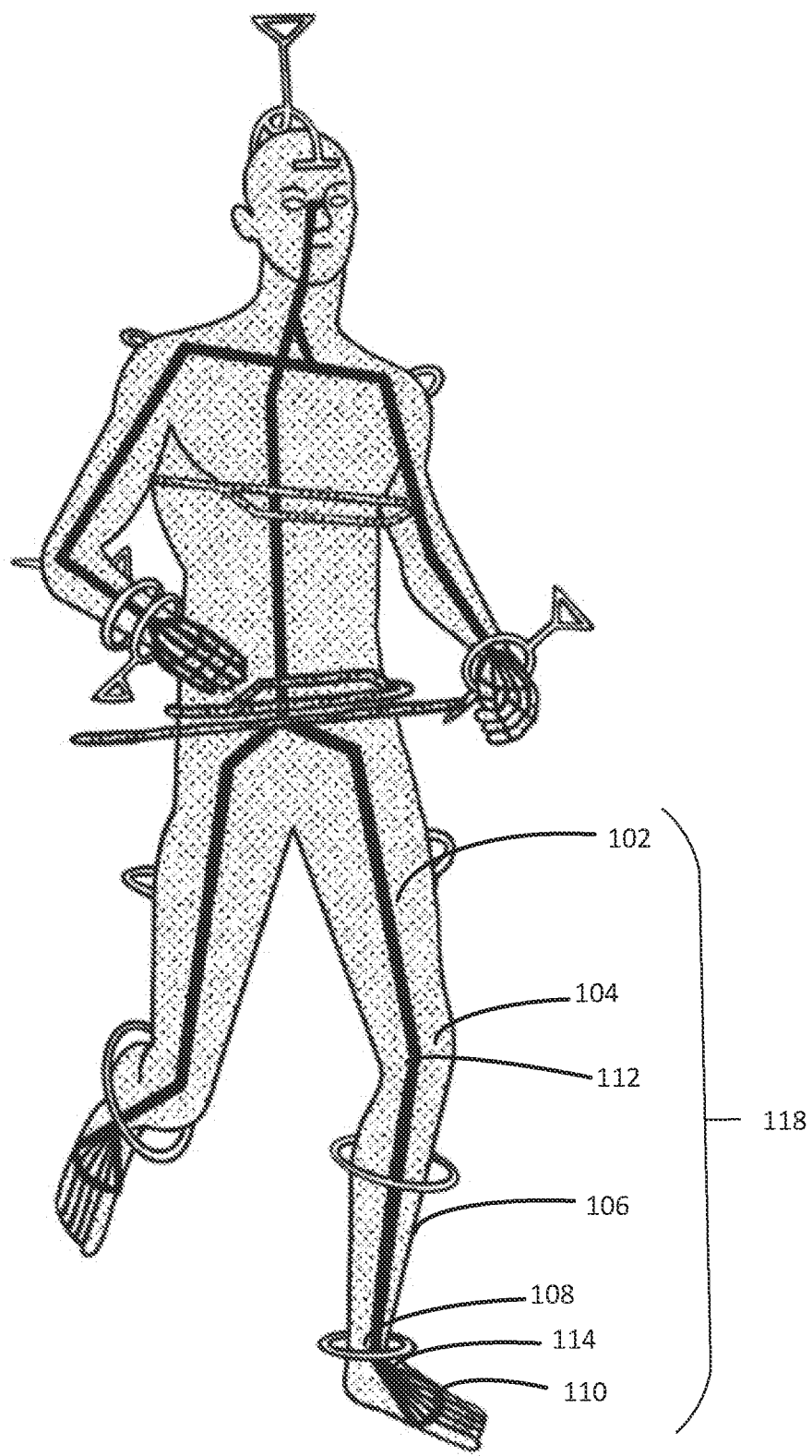
FIG. 1 shows an example of a control rig configured to enable an artist to create animation sequence data.

FIG. 1 shows an example of a control rig 100, or animated skeleton. Control rig 100 is configured to enable an artist to create animation sequence data. Animation sequence data is typically in the form of time series of data for control points of an object that has attributes that are controllable. In some examples the object includes a humanoid character with limbs and joints that are movable in manners similar to typical human movements.

Here, control rig 100 represents a humanoid character, but may be configured to represent a plurality of different characters. In an embodiment control rig 100 includes a hierarchical set of interconnected bones, connected by joints forming a kinematic chain.

For example, control rig 100 includes thigh 102, knee 104, lower leg 106, ankle 108, and foot 110, connected by joints 112, 114. Control rig 100 may be employed to individually move individual bones and joints using forward kinematics to pose a character. Moving thigh 102 causes a movement of lower leg 106, as lower leg 106 is connected to thigh 102 via knee 104. Thigh 102 and lower leg 106, for example, are in a parent-child relationship. Movement of lower leg 106 is a product of movement of thigh 102 as well as movement of lower leg 106 itself. Control rig 100 may also use inverse kinematics, in which an artist moves ankle 108 for example. If an artist moves ankle 108 upwards, knee 104 consequently bends and moves upwards to accommodate a pose in which ankle 108 is at a user specified location.

Control rig 100 may be formed using a plurality of data points. Control rig 100 may be matched to a skeleton obtained from an animation system, or from, for example, motion capture markers or other means on real-life actors. A live action scene of a human actor is captured by live action capture system 802 (see FIG. 8) while wearing mo-cap fiducials for example high-contrast markers outside actor clothing. The movement of those fiducials is determined by live action processing system 822. Animation driver generator 844 may convert that movement data into specifications of how joints of an articulated character are to move over time.

Figure 2:
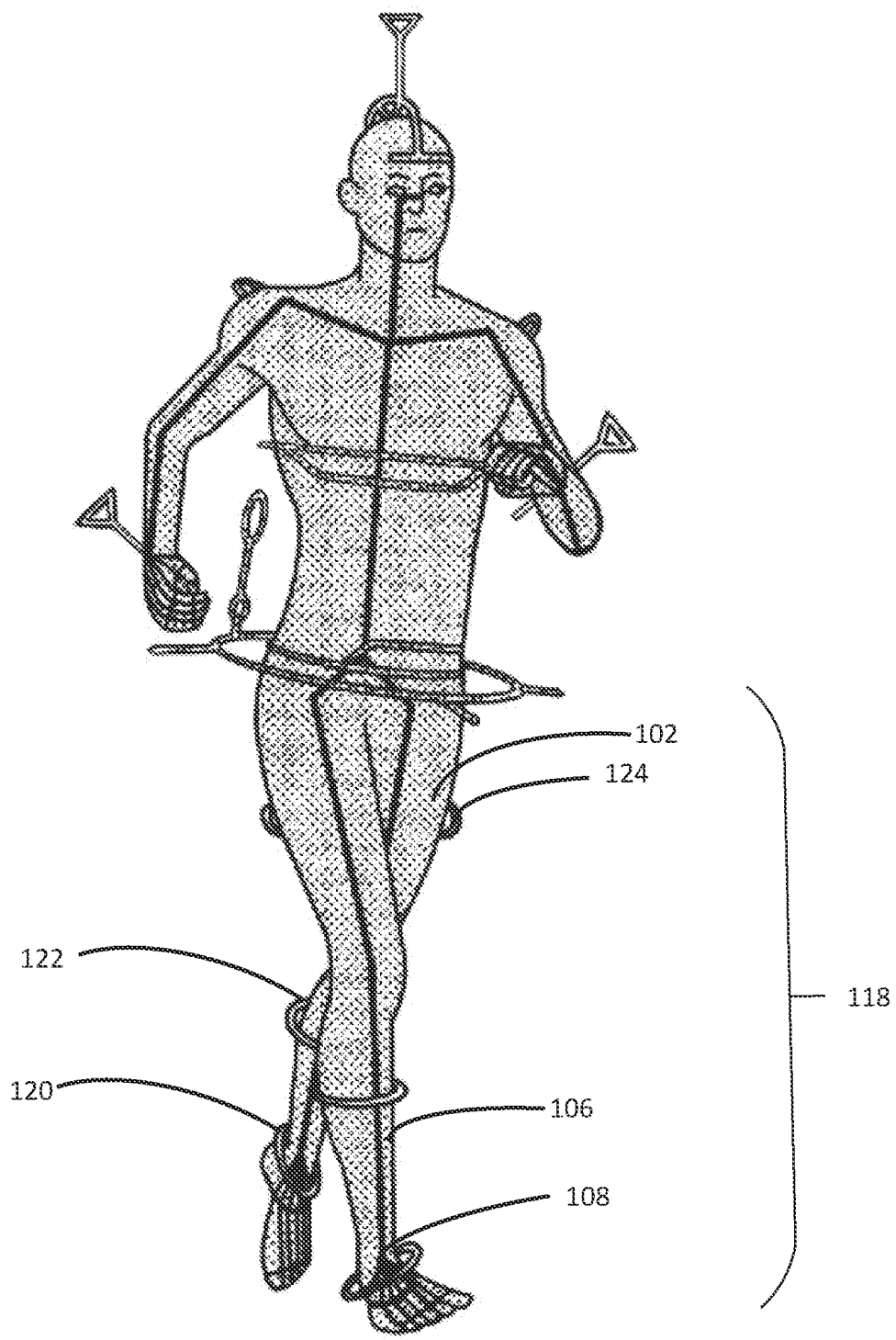
FIG. 2 shows examples of animation control points associated with the control rig of FIG. 1.

As shown in FIG. 2, control rig 100 includes a plurality of animation control points, or control points. Examples of control points are indicated at 120, 122 and 124 respectively. For example, in an embodiment control rig 100 includes control point 120 at the ankle that allows an animator to control the motion of a leg of control rig 100. In another example, control point 122 is positioned at lower leg of rig 100 and/or control point 124 is positioned at thigh 102. Different parts of the control rig 100 have associated to them respective control points.

In an embodiment, an artist may create an animation sequence by selecting a control point on control rig 100. Control rig 100 may be displayed, for example, on display 712 (see FIG. 7). The artist selects a control point using input device 714 and/or cursor 716. The control points may be displayed as extending from a character represented by control rig 100. Displaying the control points in this manner enables the artist to select a control point easily.

The artist may, for example, select control point 122 for the lower leg or control point 124 for the upper leg of control rig 100. The artist selects a position and/or location of the control point that is different to the current position and/or location of the control point. This process is known as key-framing. The artist moves controls to new positions at given times, thereby creating key poses in an animation sequence. Interpolation is performed between key poses.

In an embodiment, control points may be used to control more than one bone, joint, etc. For example, a control point may be used to control the upper arm and lower arm at the same time.

In an embodiment at least one inverse kinematics operation is performed in order to generate the animation sequence specified by the artist. For example, the artist may wish to specify that ankle 108 is to move from a location within control rig 100 shown in FIG. 1 to a location within control rig shown in FIG. 2. The artist manipulates control point 120 to specify a desired change in ankle location.

A series of calculations is performed to determine what changes in location and/or orientation of parts of control rig 100 are required to result in an orientation of control rig shown in FIG. 2. For example, the new location of control point 120 selected by the artist may require a change in location and/or orientation of at least thigh 102, knee 104, lower leg 106, ankle 108 and foot 110. The changes in location and/or orientation that are required to achieve a goal of the artist are then determined.

Figure 3:
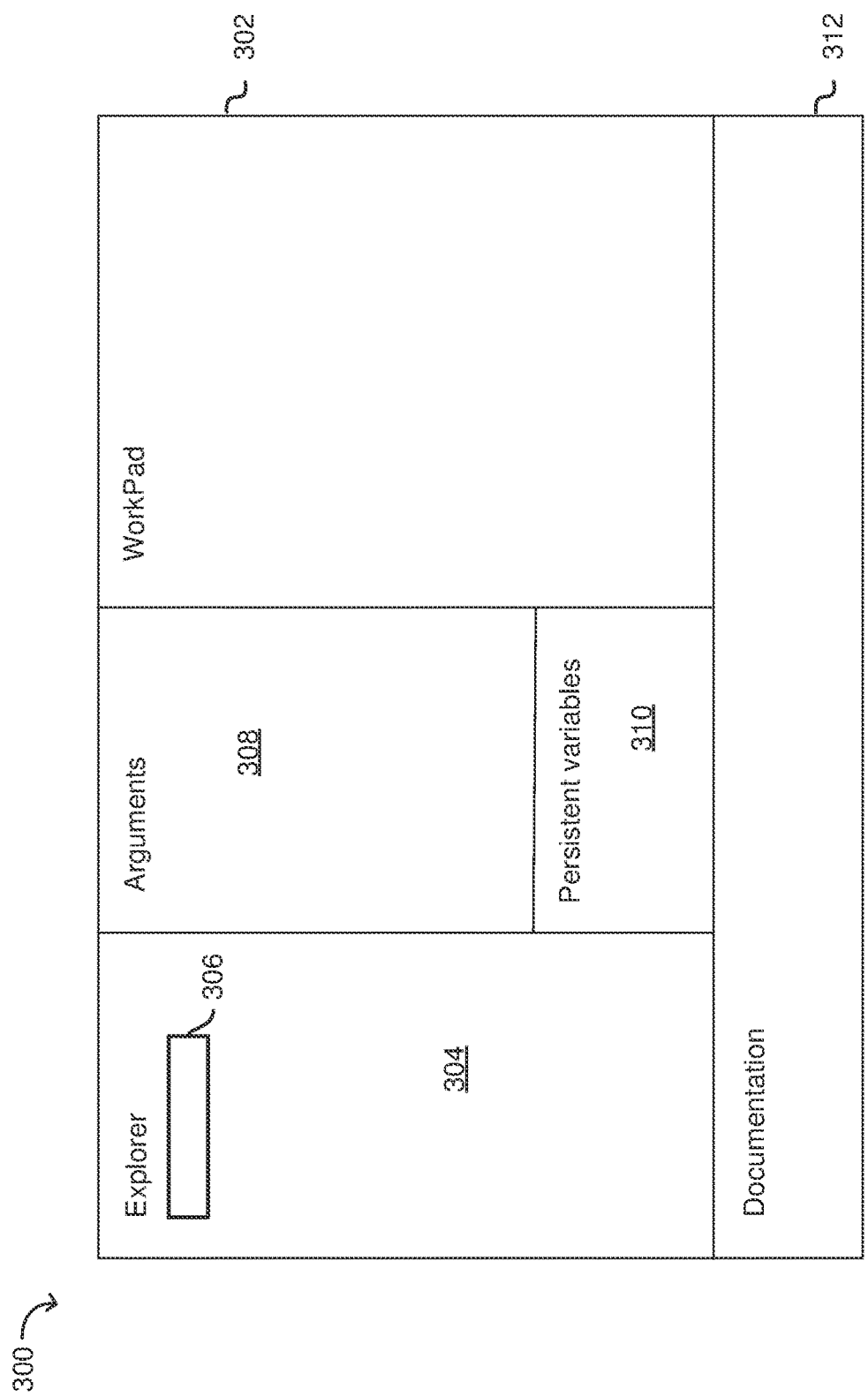
FIG. 3 shows an example of a user interface that may be used to author evaluation logic associated with the animation control rig illustrated in FIG. 1.

FIG. 3 shows an example of a user interface 300 that may be used to author evaluation logic. The evaluation logic specifies how animation controls 120, 122 and 124 (see FIG. 2) influence a skeletal hierarchy associated with control rig 100 (see FIG. 1). Animation controls may be defined and operated on using a Graphical User Interface (GUI) in an animation software package. The animation controls may then be passed as inputs to evaluation logic defined in interface 300.

Figure 7:
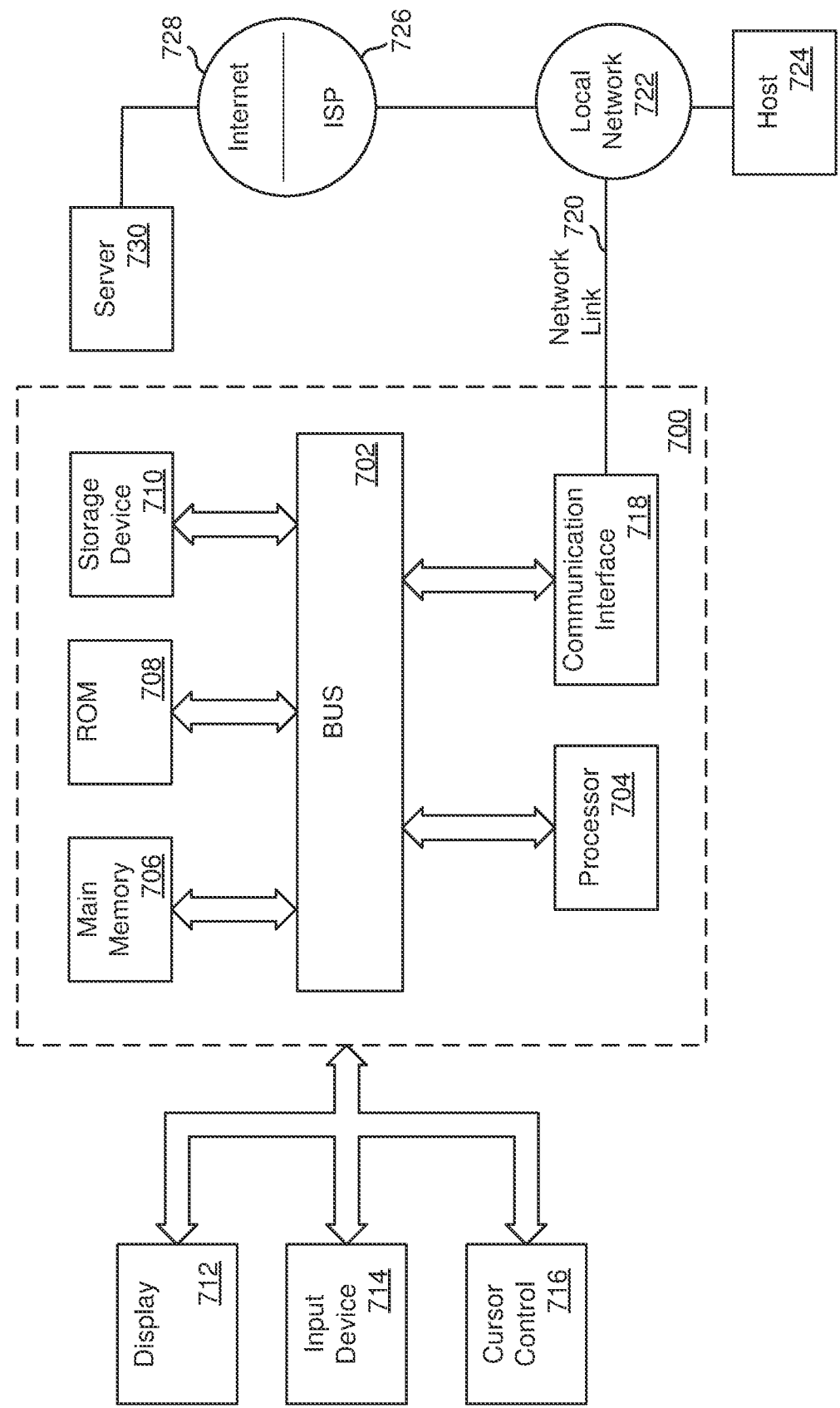
FIG. 7 is a block diagram illustrating an example computer system upon which computer systems of the systems illustrated in FIGS. 1 and 8 may be implemented.

In an embodiment user interface 300 is presented on a display, for example display 712 illustrated in FIG. 7. Inputs are received for example by a user operating input device 714 and/or cursor control 716.

In an embodiment the user interface includes a working canvas 302. The working canvas 302 is configured to receive evaluation logic from a user. Evaluation logic may include for example building blocks involving math, geometry, drawing and algorithms. Evaluation logic may also include user authored functions written in a source language such as C++ Visual Basic, Python, and the like.

In an embodiment working canvas 302 is configured to enable the user to populate working canvas 302 using a keyboard or similar. Alternatively, or additionally, working canvas 302 is configured to be populated by a user dragging and dropping components from other windows within the user interface 300.

Working canvas 302 may include controls configured to receive a user selection to expand or collapse at least some of the displayed lines of code. For example, the user may wish to expand all function calls so that they may be viewed in working canvas 302. Alternatively, the user may wish to hide all entries using a conditional widget. For example, the user may select a control that causes at least some of the entries in the conditional to collapsed or hidden.

User interface 300 may include an explorer panel 304. The executable code entered into working canvas 302 may include functions and/or datatypes, formulas, etc. In an embodiment, the explorer panel 304 includes search bar 306 that is configured to receive a user search query for at least one function or datatype. The search query is executed against a library of stored functions and datatypes. The results of the user query are displayed within the explorer panel 304, for example below the search bar 306.

In an embodiment, explorer panel 304 is configured to receive a user selection of a function or datatype that is included in the results of the user query. The selected function or datatype is able to be dragged by the user and dropped into working canvas 302. In an embodiment, working canvas 302 is configured to receive a user selection for the function or datatype of a location within the executable code displayed in working canvas 302. For example, the user may drop the selected function or datatype at a selected location within the executable code.

User interface 300 may include arguments panel 308. This panel displays data that is visible to functions, modules and components having access to the executable code displayed in working canvas 302. Arguments panel 308 may display for example an argument name, whether or not the argument value is constant or mutable, an associated processor for example CPU, and a datatype for example 'int'.

User interface 300 may include persistent variables panel 310 configured to display variables that are global in nature. In an embodiment, persistent variables remain in use and keep their respective values over multiple executions of the evaluation logic. Persistent variables are not typically shared between different characters.

User interface 300 may also include documentation panel 312. In an embodiment, documentation panel 312 displays any documentation associated with a selected function. For example, user interface 300 may receive a user selection of a function. Documentation panel 312 displays documentation associated with that user selected function.

In an embodiment, the evaluation logic is executed in a linear fashion, e.g., from top to bottom. The evaluation logic displayed in working canvas 302 is packaged into an executable code object. Examples of how such executable code objects are manipulated are further described below.

Figure 4:
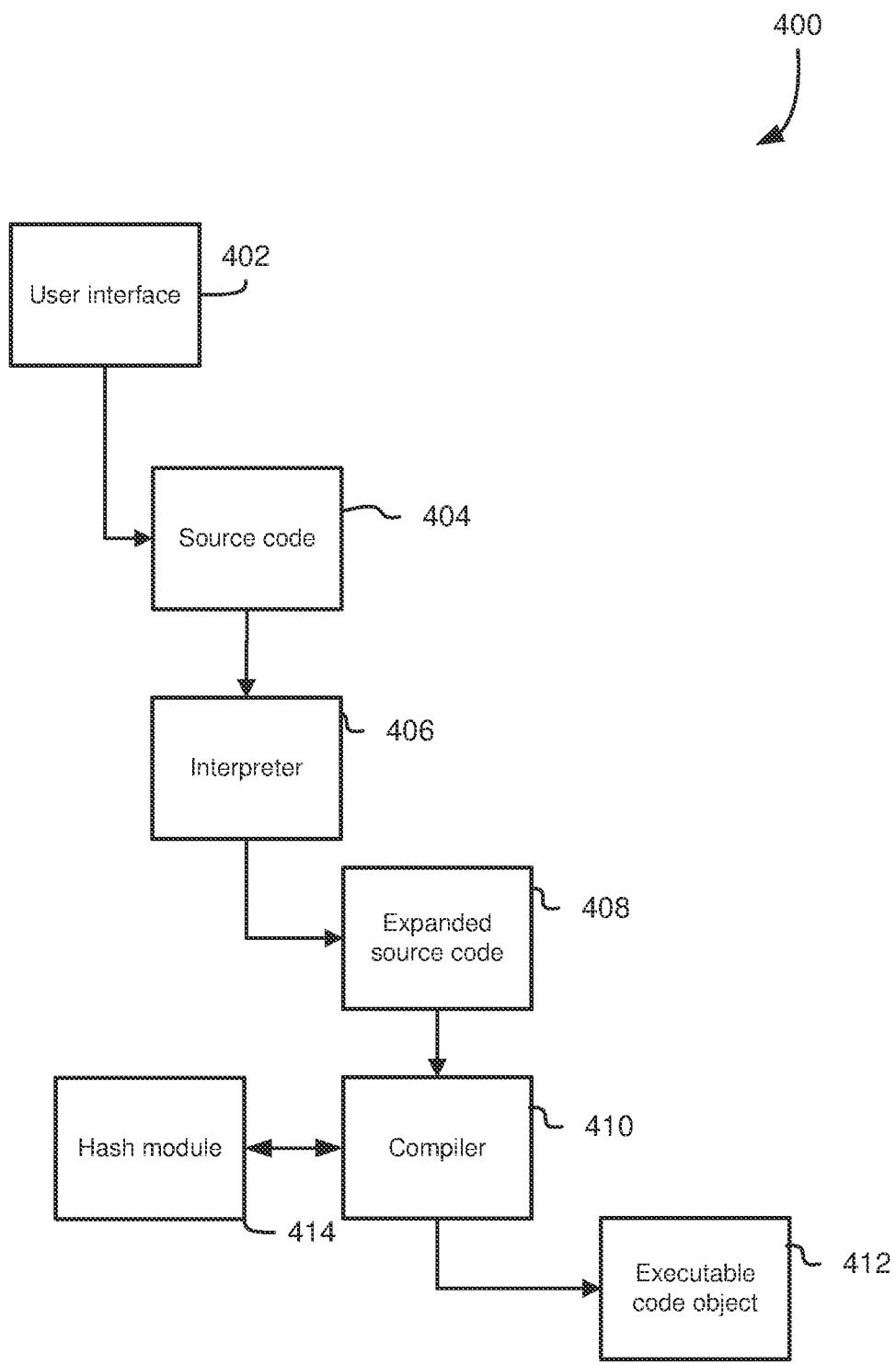
FIG. 4 shows an example of a process for compiling and testing evaluation logic.

FIG. 4 shows an example of a process 400 for compiling and testing evaluation logic. In an embodiment, evaluation logic is constructed within user interface 402. One example of user interface 402 includes user interface 300 from FIG. 3. As described above, user interface 300 enables a user to construct modules of evaluation logic as either function building blocks, user authored functions, or a combination of the foregoing.

The modules, once authored, are copied out to multiple files on a computer system such as computer system 700 illustrated in FIG. 7. This process results in multiple copies of the modules. Different copies of the modules are used to execute the code authored by the user.

The modules are typically authored in a source language and compiled to a binary or intermediate representation. Compiling the code is performed in a "compiling environment" that can be affected by various factors or parameters. Examples of parameters include an Application Binary Interface (ABI), visual effects platform, GPU host and CPU host. Any changes to the parameters may require the compiled code to change also.

Different copies of modules and/or compiled code cannot be changed easily to operate on different versions of ABI, visual effects platform and host. Furthermore, the copied modules may be difficult to retrieve and/or edit.

Evaluation logic from the user interface 402 is written to source code language 404. As described above, one example of source code language 404 is C++.

In an embodiment, process 400 includes interpreter 406 as part of the build process. Source code 404 is passed to interpreter 406. One example of interpreter 406 is the CLING™ interpreter. In an embodiment interpreter 406 highlights any errors in source code 404 before source code 404 is compiled. The user may, for example, edit evaluation logic in user interface 402 in order to generate source code 404 that is free of errors highlighted by interpreter 406.

In an embodiment, interpreter 406 generates expanded source code 408. Once the user is satisfied with the performance of expanded source code 408 the user may elect to pass expanded source code 408 to compiler 410. One example of compiler 410 is the CLANG™ compiler. Compiler 410 generates executable code object(s) 412 that are stored for subsequent use.

In an embodiment, compiler 410 is in communication with hash module 414. Hash module 414 is configured to receive and/or determine a set of parameters associated with settings and software employed to compile expanded source code 408 received by compiler 410. As will be described below, hash module 414 is configured to form a first hash of the set of parameters. The first hash establishes a unique identification of the set of parameters. Hash module 414 receives and hashes the source code by associating the first hash with the received source code and/or executable code object 412.

The set of parameters may include a version of the software used to compile source code 408. Compiler 410 may have an associated version number which may be included in the set of parameters. In another example, the set of parameters may include a software processing or storage hierarchy. Storage hierarchies are described further below. In a further example, the set of parameters may include a version number associated with an ABI, visual effects platform and/or host. The visual effects platform can include any specifics of hardware and/or software in a development or execution environment that are relied-upon at a time of compilation or execution in order for a compiled IR to execute properly.

Figure 5:
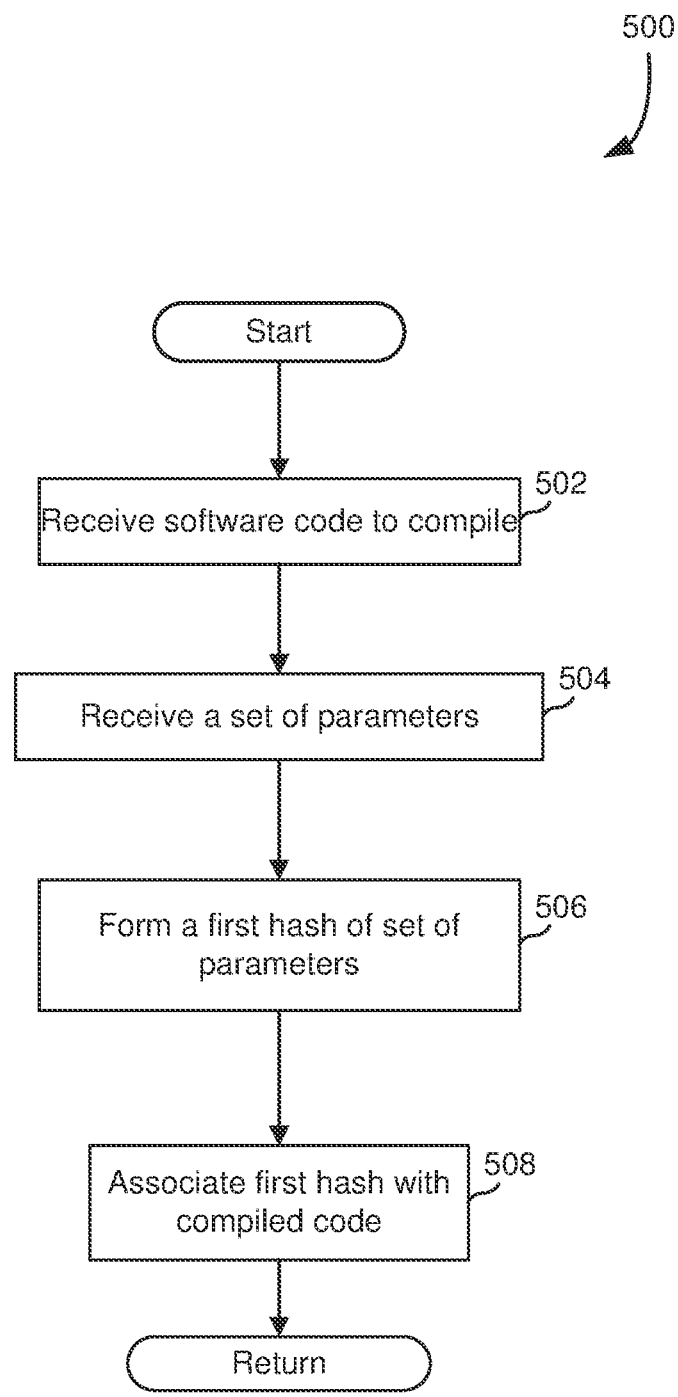
FIG. 5 shows an example of a method for associating a unique identifier with compiled code.

FIG. 5 shows an example of a method 500 followed by hash module 414 of FIG. 4 for associating a unique identifier with compiled code.

The method includes receiving 502 software code to compile. For example, compiler 410 from FIG. 4 may receive source code to compile. A set of parameters is received 504. This set of parameters may be associated with settings and software employed to compile the source code. In an embodiment the set of parameters includes a version number associated with compiler 310. In an embodiment the set of parameters includes a software processing or storage hierarchy, as will be described below. In an embodiment the set of parameters may include any number of parameters which may include an editor version, visual effects platform version, source code version and/or host processor.

Hash module 414 forms 506 a first hash of the set of parameters. The first hash may include, for example, an alphanumeric code or binary number. In an embodiment, the first hash may be checked through a checksum or other similar mechanism.

In an embodiment, the set of parameters is ordered prior to forming the first hash of the set of parameters. Forming the first hash of the set of parameters includes determining an order of the set or parameters so as to increase the likelihood of a match between the first hash and other hashes. The matching process is described in more detail below.

In an embodiment the first hash establishes a unique identification of the set of parameters used to compile the source code. For example, the first hash may establish a unique identification from the editor version, visual effects platform version, code version and host of the source code.

The first hash is then associated 508 with the compiled code. In an embodiment the first hash is associated with executable code object 412 from FIG. 4.

Figure 6:
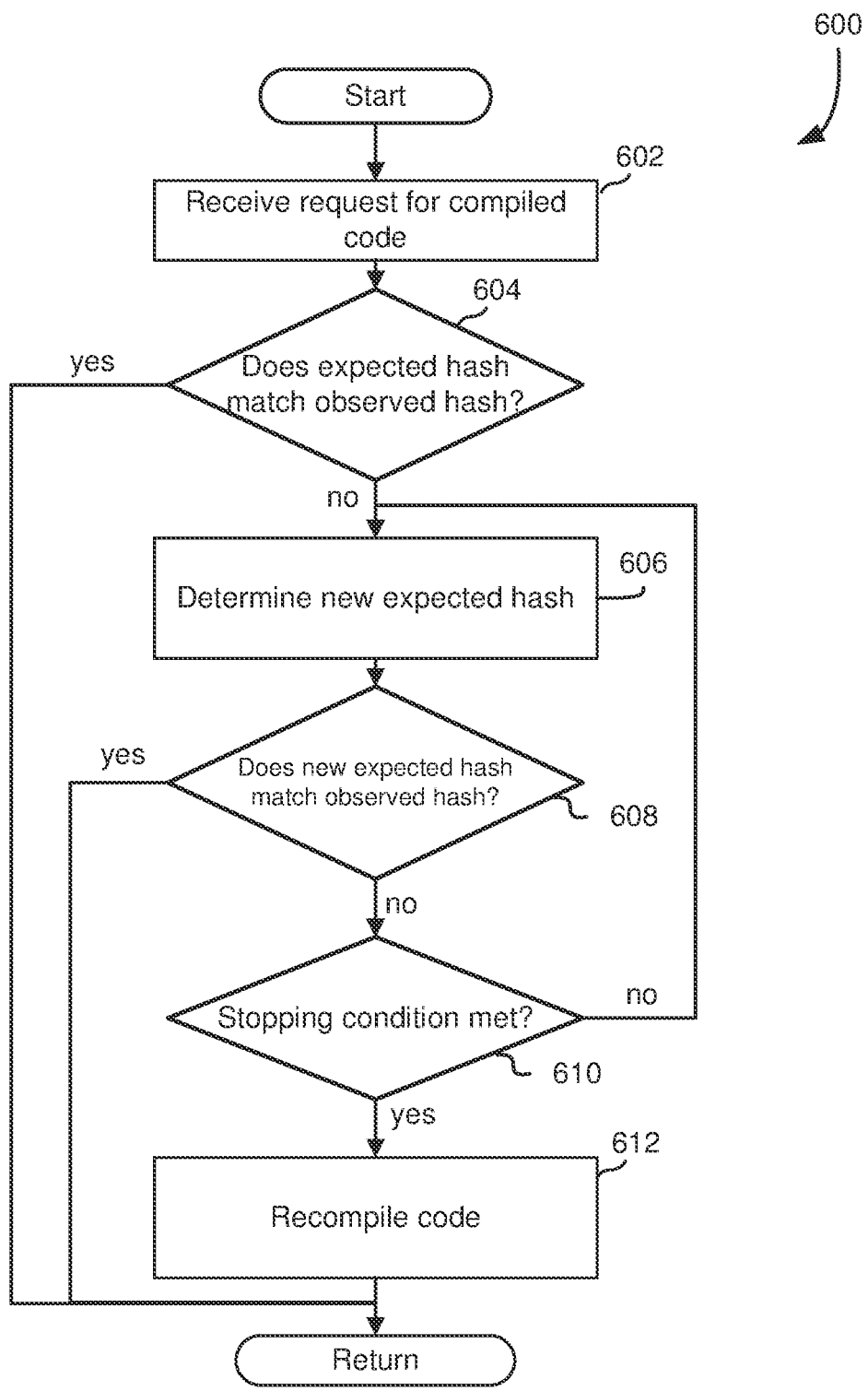
FIG. 6 shows an example of a method for checking compatibility of compiled code.

FIG. 6 shows an example of a method 600 involving hash module 414 of FIG. 4 for checking compatibility of compiled code.

Method 600 includes receiving 602 a request for compiled code. In an embodiment the compiled code has associated with it a first hash. The first hash may have been created for example by method 500 from FIG. 5.

In an embodiment, a module requesting the compiled code will expect the compiled code to be associated with a particular hash value. This may be for example that compiled code made available from previous requests has been associated with a particular hash value, and that particular hash value is expected in subsequent requests for compiled code.

Following a request, the compiled code made available has an associated hash value, referred to as a first hash or an observed hash. The hash expected by the requesting module is referred to as a second hash or expected hash. Expected hash is compared 604 with observed hash.

If the expected hash does not match the observed hash then the method may include one or more techniques to cause the expected hash to match the observed hash.

For example, an attempt may be made to determine 606 a new second hash. Where the expected hash does not match the observed hash, it is possible that the expected hash value is wrong. The module requesting the compiled code may have access to the set of parameters associated with settings and software employed to compile different instances of source code.

In an embodiment, different combinations of parameters over a range of parameter values are used to create new second hash. New second hash is compared 608 with observed hash. Where the new second hash does not match the first hash then a different combination of parameters is used to create new second hash until a stopping condition 610 is met.

In one example different combinations of parameters may be selected recursively. In this situation the stopping condition may include a check to determine whether or not all possible combinations of parameters have been selected. Alternatively, the stopping condition may include a check to determine whether or not a significant number of combinations of parameters have been selected.

If the stopping condition is satisfied without finding a match between the first hash and a new second hash, the code is recompiled 612. In an embodiment the code may be recompiled using method 500 from FIG. 5 creating a new first hash for the code.

If the expected hash does not match the observed hash then the method may include searching for stored compiled code blocks.

For example, previous versions of compiled code may be maintained in a memory structure such as a cache. The cache may be maintained for example on memory 706, storage device 710, processor 704 and/or server 730 (see FIG. 7). In an embodiment a plurality of stored compiled code blocks is maintained in the cache. At least some of the stored compiled code blocks are associated with respective stored hashes.

In an embodiment, the plurality of stored compiled code blocks is searched for a stored hash that matches the second or expected hash. Where a match is found, the compiled code block having the matching hash is retrieved from the cache.

If the expected hash does not match the observed hash then the method may include searching for stored compiled code blocks that match parts of the compiled code. The code blocks having matching hashes can then be combined in order to reduce the need for recompilation.

For example, the compiled code may include a sequence of functional blocks. The method may include partitioning the compiled code into a plurality of code blocks representing respective functional blocks, then searching a plurality of stored compiled code blocks that match the partitioned compiled code blocks.

The technique is described by way of an example of partitioning the compiled code into at least a first code block and a second code block. It will be appreciated that it is possible to partition the compiled code into more than two code blocks.

In an embodiment at least the first code block is associated with a first code block hash. The first code block hash may have already been associated with the first code block. Alternatively, a new first code block hash may be created for at least the first code block following partitioning of the compiled code. The new first code block hash is then associated with the first code block.

The plurality of stored compiled code blocks is searched for a stored hash that matches the first code block hash. Where a match is found, the compiled code block having the matching hash is retrieved from the cache. The retrieved compiled code block is then combined with at least the second code block.

In an embodiment, requested compiled code may be stored in a hierarchy of memory storage locations with an expected hash of a set of parameters associated with the requested compiled code. In this case, an observed hash acts as a look up key for the requested compiled code within the storage hierarchy. The hierarchy has multiple levels of memory storage locations. The memory storage locations may include (1) a current software module with which a user is working, (2) local storage on a user's machine such as in a cache, main memory, magnetic storage device, etc.; (3) a remote computer or networked storage or the like—such as in a database (e.g., SQL database, etc.). Any other type of memory storage locations may be included in the storage hierarchy, such as main memory 706, storage device 710, processor 704 and/or server 730 (see FIG. 7). In general, the hierarchy is defined as smaller but faster access storage that is checked first then proceeding to progressively larger but slower access storage, as with the ordered categories of storage—1, 2 and 3—just described.

In an embodiment a configuration file may select the order in which the different levels of the storage hierarchy are used to obtain an expected hash. In an example, the configuration file may select the module storage location to obtain an expected hash. If the expected hash does not match an observed hash, the cache storage location may be selected to obtain a new expected hash to compare with the observed hash.

The configuration file may also provide the stopping condition for comparing first and second hashes based on the number of memory storage locations in the storage hierarchy. In an embodiment, a plurality of second hashes are obtained from the storage hierarchy from a relatively faster accessible location to a relatively slower accessible location.

If a second hash that matches with a first hash is obtained from a location further down the storage hierarchy, copies of the requested compiled code may be stored at higher levels of the storage hierarchy.

In an embodiment, compiled code using method 500 shown in FIG. 5 is stored at a lower level of the storage hierarchy. In an embodiment, the lower level of the storage hierarchy is a centralized server location accessible by multiple machines, for example server 730 (see FIG. 7). This may be implemented through a manual or automatic operation, when a user decides to store the compiled code at a lower level location. In another embodiment, recompiled code from step 612 of method 600 (see FIG. 6) is automatically stored in a lower level location.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 7 is a block diagram that illustrates a computer system 700 upon which the animation rig 100 (see FIG. 1), the user interface 300 (see FIG. 3) and/or the visual content generation system 800 (see FIG. 8) may be implemented. The computer system 700 includes a bus 702 or other communication mechanism for communicating information, and a processor 704 coupled with the bus 702 for processing information. The processor 704 may include, for example, a general purpose microprocessor, a CPU, a GPU, or any combination of the foregoing.

The computer system 700 also includes a main memory 706, such as a random access memory (RAM) or other dynamic storage device, coupled to the bus 702 for storing information and instructions to be executed by the processor 704. The main memory 706 may also be used for storing temporary variables or other intermediate information during execution of instructions to be executed by the processor 704. Such instructions, when stored in non-transitory storage media accessible to the processor 704, render the computer system 700 into a special-purpose machine that is customized to perform the operations specified in the instructions.

The computer system 700 further includes a read only memory (ROM) 708 or other static storage device coupled to the bus 702 for storing static information and instructions for the processor 704. A storage device 710, such as a magnetic disk or optical disk, is provided and coupled to the bus 702 for storing information and instructions.

The computer system 700 may be coupled via the bus 702 to a display 712, such as a computer monitor, for displaying information to a computer user. An input device 714, including alphanumeric and other keys, is coupled to the bus 702 for communicating information and command selections to the processor 704. Another type of user input device is a cursor control 716, such as a mouse, a trackball, or cursor direction keys for communicating direction information and command selections to the processor 704 and for controlling cursor movement on the display 712. This input device typically has two degrees of freedom in two axes, a first axis (e.g., x) and a second axis (e.g., y), that allows the device to specify positions in a plane.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 710. Volatile media includes dynamic memory, such as the main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 702. Transmission media can also take the form of acoustic or light waves, such as those generated during radio-wave and infra-red data communications.

Various forms of media may be involved in carrying one or more sequences of one or more instructions to the processor 704 for execution. For example, the instructions may initially be carried on a magnetic disk or solid state drive of a remote computer. The remote computer can load the instructions into its dynamic memory and send the instructions over a network connection. A modem or network interface local to the computer system 700 can receive the data. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 provides a two-way data communication coupling to a network link 720 that is connected to a local network 722. For example, the communication interface 718 may be an integrated services digital network (ISDN) card, cable modem, satellite modem, or a modem to provide a data communication connection to a corresponding type of telephone line. Wireless links may also be implemented. In any such implementation, the communication interface 718 sends and receives electrical, electromagnetic, or optical signals that carry digital data streams representing various types of information.

The network link 720 typically provides data communication through one or more networks to other data devices. For example, the network link 720 may provide a connection through the local network 722 to a host computer 724 or to data equipment operated by an Internet Service Provider (ISP) 726. The ISP 726 in turn provides data communication services through the world wide packet data communication network now commonly referred to as the "Internet" 728. The local network 722 and Internet 728 both use electrical, electromagnetic, or optical signals that carry digital data streams. The signals through the various networks and the signals on the network link 720 and through the communication interface 718, which carry the digital data to and from the computer system 700, are example forms of transmission media.

The computer system 700 can send messages and receive data, including program code, through the network(s), the network link 720, and communication interface 718. In the Internet example, a server 730 might transmit a requested code for an application program through the Internet 728, ISP 726, local network 722, and communication interface 718. The received code may be executed by the processor 704 as it is received, and/or stored in the storage device 710, or other non-volatile storage for later execution.

Figure 8:
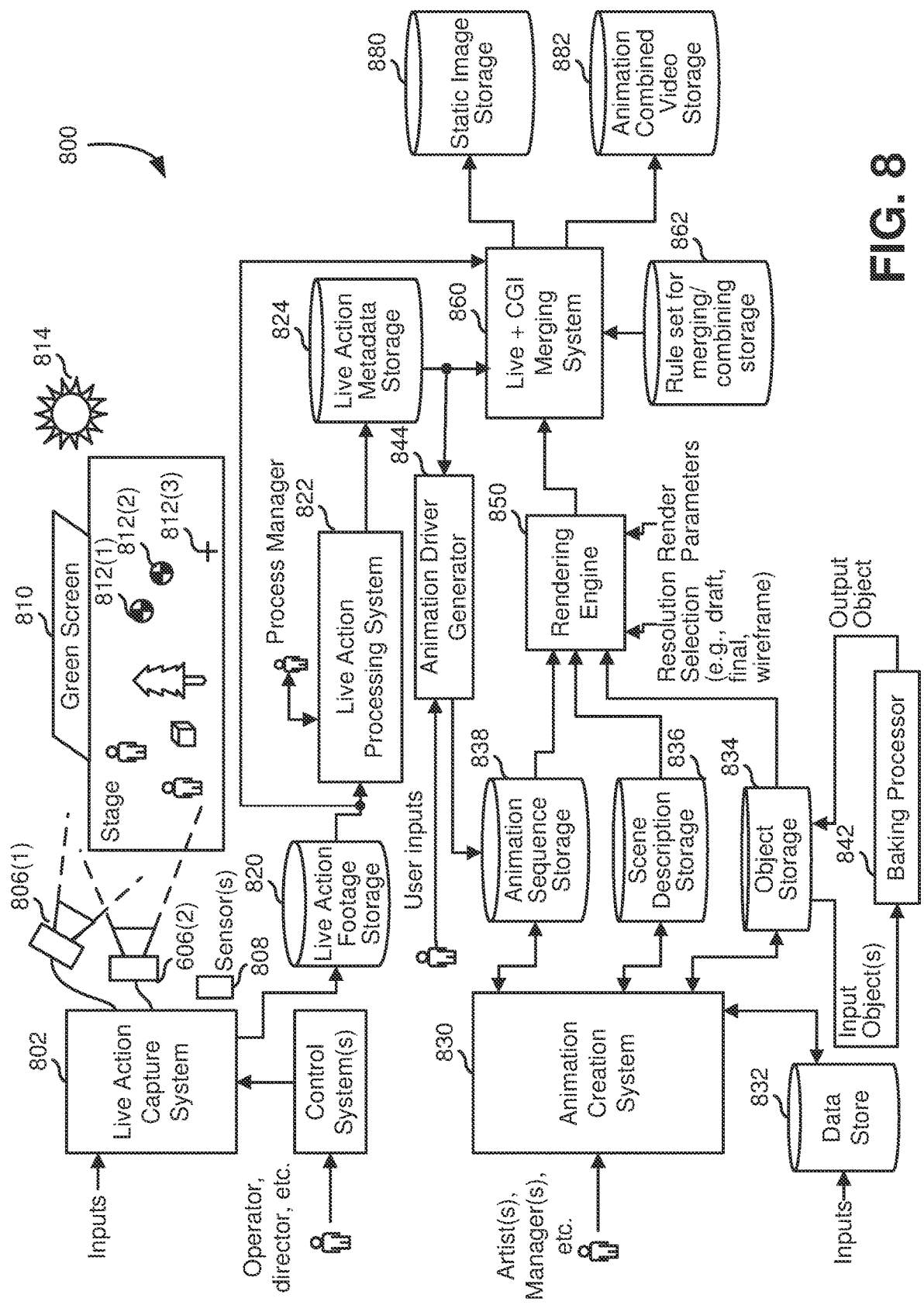
FIG. 8 illustrates an example visual content generation system as might be used to generate imagery in the form of still images and/or video sequences of images.

For example, FIG. 8 illustrates the example visual content generation system 800 as might be used to generate imagery in the form of still images and/or video sequences of images. The visual content generation system 800 might generate imagery of live action scenes, computer generated scenes, or a combination thereof. In a practical system, users are provided with tools that allow them to specify, at high levels and low levels where necessary, what is to go into that imagery. For example, a user might be an animation artist (like the artist operating animation creation system 830 illustrated in FIG. 8) and might use the visual content generation system 800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., the artist operating animation creation system 830 illustrated in FIG. 8) might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 8, a live action capture system 802 captures a live scene that plays out on a stage 804. The live action capture system 802 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 806(1) and 806(2) capture the scene, while in some systems, there might be other sensor(s) 808 that capture information from the live scene (e.g., infrared cameras, infrared sensors, motion capture ("mo-cap") detectors, etc.). On the stage 804, there might be human actors, animal actors, inanimate objects, background objects, and possibly an object such as a green screen 810 that is designed to be captured in a live scene recording in such a way that it is easily overlaid with computer-generated imagery. The stage 804 might also contain objects that serve as fiducials, such as fiducials 812(1)-(3), that might be used post-capture to determine where an object was during capture. A live action scene might be illuminated by one or more lights, such as an overhead light 814.

During or following the capture of a live action scene, the live action capture system 802 might output live action footage to a live action footage storage 820. A live action processing system 822 might process live action footage to generate data about that live action footage and store that data into a live action metadata storage 824. The live action processing system 822 might include computer processing capabilities, image processing capabilities, one or more processors, program code storage for storing program instructions executable by the one or more processors, as well as user input devices and user output devices, not all of which are shown. The live action processing system 822 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 814, as that might be useful in post-processing to match computer-generated lighting on objects that are computer-generated and overlaid on the live action footage. The live action processing system 822 might operate autonomously, perhaps based on predetermined program instructions, to generate and output the live action metadata upon receiving and inputting the live action footage. The live action footage can be camera-captured data as well as data from other sensors.

An animation creation system 830 is another part of the visual content generation system 800. The animation creation system 830 might include computer processing capabilities, image processing capabilities, one or more processors, program code storage for storing program instructions executable by the one or more processors, as well as user input devices and user output devices, not all of which are shown. The animation creation system 830 might be used by animation artists, managers, and others to specify details, perhaps programmatically and/or interactively, of imagery to be generated. From user input and data from a database or other data source, indicated as a data store 832, the animation creation system 830 might generate and output data representing objects (e.g., a horse, a human, a ball, a teapot, a cloud, a light source, a texture, etc.) to an object storage 834, generate and output data representing a scene into a scene description storage 836, and/or generate and output data representing animation sequences to an animation sequence storage 838.

Scene data might indicate locations of objects and other visual elements, values of their parameters, lighting, camera location, camera view plane, and other details that a rendering engine 850 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 830 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 834 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 832 might be used to drive object presentation. For example, if an artist is creating an animation of a spaceship passing over the surface of the Earth, instead of manually drawing or specifying a coastline, the artist might specify that the animation creation system 830 is to read data from the data store 832 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 844 might read in live action metadata, such as data representing movements and positions of body parts of a live actor during a live action scene, and generate corresponding animation parameters to be stored in the animation sequence storage 838 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 822. The animation driver generator 844 might convert that movement data into specifications of how joints of an articulated CGI character are to move over time.

A rendering engine 850 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 850 might include computer processing capabilities, image processing capabilities, one or more processors, program code storage for storing program instructions executable by the one or more processors, as well as user input devices and user output devices, not all of which are shown.

The visual content generation system 800 can also include a merging system 860 that merges live footage with animated content. The live footage might be obtained and input by reading from the live action footage storage 820 to obtain live action footage, by reading from the live action metadata storage 824 to obtain details such as presumed segmentation in captured images segmenting objects in a live action scene from their background (perhaps aided by the fact that the green screen 810 was part of the live action scene), and by obtaining CGI imagery from the rendering engine 850.

A merging system 860 might also read data from a rulesets for merging/combining storage 862. A very simple example of a rule in a ruleset might be "obtain a full image including a two-dimensional pixel array from live footage, obtain a full image including a two-dimensional pixel array from the rendering engine 850, and output an image where each pixel is a corresponding pixel from the rendering engine 850 when the corresponding pixel in the live footage is a specific color of green, otherwise output a pixel value from the corresponding pixel in the live footage."

The merging system 860 might include computer processing capabilities, image processing capabilities, one or more processors, program code storage for storing program instructions executable by the one or more processors, as well as user input devices and user output devices, not all of which are shown. The merging system 860 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 860, such as modifying boundaries of segmented objects, inserting blurs to smooth out imperfections, or adding other effects. Based on its inputs, the merging system 860 can output an image to be stored in a static image storage 870 and/or a sequence of images in the form of video to be stored in an animated/combined video storage 872.

Thus, as described, the visual content generation system 800 can be used to generate video that combines live action with computer-generated animation using various components and tools, some of which are described in more detail herein. While the visual content generation system 800 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for creating a digital animation sequence of a control rig, the method using a network of computers in a system that includes a storage hierarchy and a compiling environment, the method comprising:
    identifying an Intermediate Representation (IR) of functionality to animate the control rig;
    receiving a signal from a user input device at a local computer to execute the IR;
    generating a lookup key derived from at least a portion of the IR and from at least a portion of a definition of a compiling environment for the local computer, wherein the definition of the compiling environment includes at least one of a group of parameters consisting of: a description of a hardware platform, a portion of a visual effects platform, and a source code version;
    checking for a match of the lookup key within the storage hierarchy;
    if a match is found, then using a compiled form of the IR associated with the matched lookup key to cause animation of the control rig; and
    if a match is not found, then generating a new compiled form of the IR and storing it in the storage hierarchy in association with the generated lookup key and storing the lookup key in the storage hierarchy in association with the new compiled form for use in later matching.

2. The method of claim 1, wherein the definition of a compiling environment includes at least a portion of an application binary interface (ABI).

3. The method of claim 1, wherein the definition of a compiling environment includes identification of a host processor.

4. The method of claim 3, wherein the host includes a CPU.

5. The method of claim 3, wherein the host includes a GPU.

6. The method of claim 1, wherein checking for a match in the storage hierarchy includes:
    checking within a module.

7. The method of claim 1, wherein checking for a match includes:
    checking a local cache.

8. The method of claim 1, wherein checking for a match includes:
    checking a local storage device.

9. The method of claim 1, wherein for a match includes checking a networked database.

10. The method of claim 1, wherein checking the storage hierarchy includes checking in the following order: module, local storage, networked storage.

11. The method of claim 1, further comprising:
    automatically generating lookup keys for a plurality of predetermined IRs;
    checking each of the generated lookup keys for a match; and
    if no match is found then automatically generating and storing new code in association with each unmatched lookup key for use in later matching.

12. A computer system comprising:
    one or more processors; and
    a non-transitory storage medium including instructions which, when executed by the one or more processor, cause the system to implement the method of claim 1.

13. A non-transitory storage medium including instructions which, when executed by at least one processor, cause the at least one processor to implement the method of claim 1.

* * * * *